(12) United States Patent
Aichi

(10) Patent No.: US 11,009,757 B2
(45) Date of Patent: May 18, 2021

(54) LIQUID CRYSTAL DISPLAY

(71) Applicant: SHARP KABUSHIKI KAISHA, Sakai (JP)

(72) Inventor: Hiroshi Aichi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/816,074

(22) Filed: Mar. 11, 2020

(65) Prior Publication Data

US 2020/0292897 A1  Sep. 17, 2020

Related U.S. Application Data

(60) Provisional application No. 62/818,729, filed on Mar. 14, 2019.

(51) Int. Cl.
*G02F 1/1368* (2006.01)
*G02F 1/1362* (2006.01)

(52) U.S. Cl.
CPC .. *G02F 1/136286* (2013.01); *G02F 1/136209* (2013.01); *G02F 1/136277* (2013.01)

(58) Field of Classification Search
None
See application file for complete search history.

(56) References Cited

U.S. PATENT DOCUMENTS

| | | | |
|---|---|---|---|
| 2009/0207332 A1* | 8/2009 | Zhang | G02F 1/135 349/43 |
| 2017/0153752 A1* | 6/2017 | Kurasawa | G06F 3/0412 |
| 2018/0261628 A1* | 9/2018 | Imai | H01L 27/1259 |
| 2018/0286888 A1* | 10/2018 | Yamaguchi | H01L 29/78675 |
| 2020/0335530 A1* | 10/2020 | Suzumura | H01L 27/32 |
| 2020/0350341 A1* | 11/2020 | Hanada | H01L 27/1251 |

FOREIGN PATENT DOCUMENTS

JP   2004-140175 A   5/2004

* cited by examiner

*Primary Examiner* — Thanh Nhan P Nguyen
(74) *Attorney, Agent, or Firm* — ScienBiziP, P.C.

(57) ABSTRACT

A liquid crystal display includes: an active matrix substrate; an opposite substrate facing the active matrix substrate; and a liquid crystal layer provided between the active matrix substrate and the opposite substrate. The liquid crystal display includes a plurality of pixels. The active matrix substrate includes: a first substrate; a base coat layer; a plurality of TFTs; a plurality of scanning wirings; and a plurality of signal wirings. The active matrix substrate further includes a plurality of second light-shielding layers provided between the first substrate and the base coat layer. The base coat layer includes a silicon nitride layer.

7 Claims, 10 Drawing Sheets

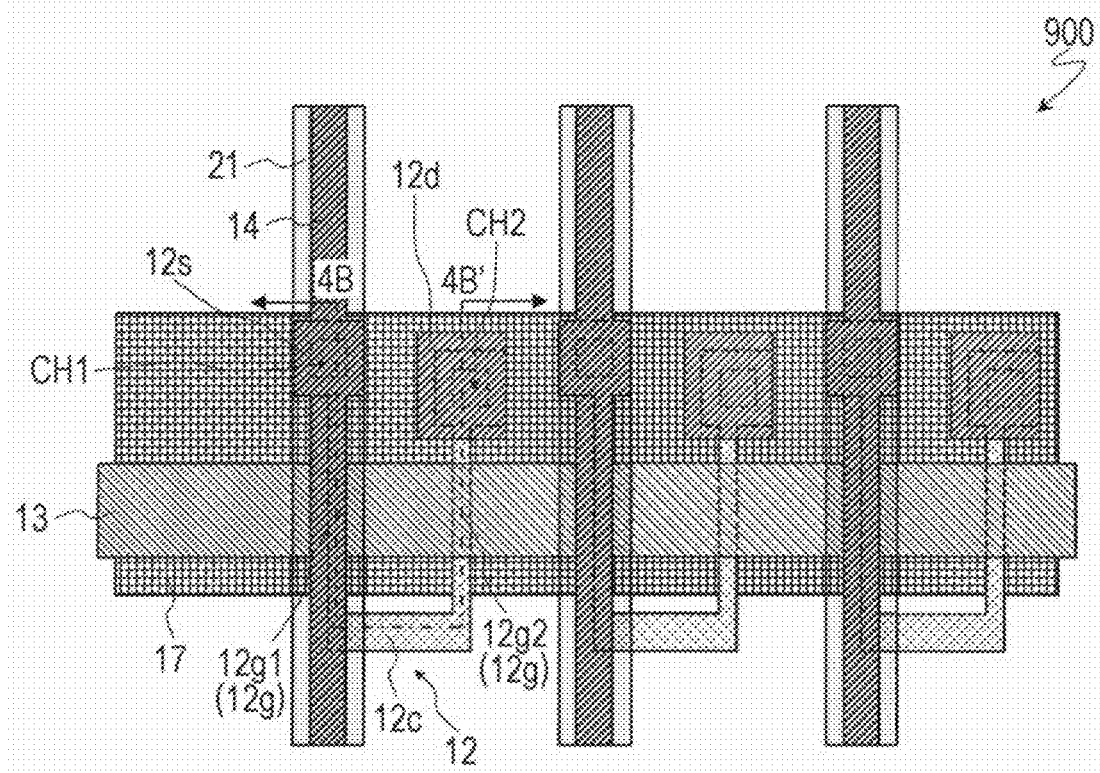

LIQUID CRYSTAL DISPLAY

CROSS-REFERENCE TO RELATED APPLICATION

The present application claims priority from Provisional Application 62/818,729, the content to which is hereby incorporated by reference into this application.

BACK GROUND OF THE INVENTION

1. Field of the Invention

The present disclosure relates to a liquid crystal display.

2. Description of the Related Art

An active matrix substrate used in a liquid crystal display includes a thin film transistor (hereinafter "TFT") as a switching device for each pixel. The active layer of such a TFT is roughly classified into a semiconductor layer consisting of amorphous silicon (hereinafter referred to as "amorphous silicon semiconductor layer") and a semiconductor layer consisting of crystalline silicon (hereinafter referred to as "crystalline silicon semiconductor layer").

The amorphous silicon semiconductor layer can be easily produced but has low carrier mobility. Accordingly, a TFT requiring high-speed operation uses the crystalline silicon semiconductor layer that can realize higher carrier mobility than the amorphous silicon semiconductor layer. A TFT including a crystalline silicon semiconductor layer as the active layer may be referred to as "crystalline silicon TFT" hereinafter. A method for producing a crystalline silicon semiconductor layer is disclosed in, for example, Japanese Unexamined Patent Application Publication No. 2004-140175. The crystalline silicon is specifically, for example, polycrystalline silicon or microcrystalline silicon. Polycrystalline silicon produced through a relatively low-temperature process is called low-temperature polycrystalline silicon (LTPS).

In addition, in recent years, an increase in definition of liquid crystal displays has been further enhanced. One application of a high-definition liquid crystal display is, for example, a head mounted display (HMD). In a liquid crystal display for the HMD, recently, a pixel density of more than 1000 ppi is desired in some cases.

SUMMARY OF THE INVENTION

The present inventor has studied in detail application of a liquid crystal display including crystalline silicon TFTs having a top-gate structure to an HMD. In the crystalline silicon TFTs having a top-gate structure, in order to suppress off-leak, it is necessary to provide a light-shielding film (called "channel light-shielding film") for preventing the light from the back light from entering the crystalline silicon semiconductor layer. According to the study by the present inventor, it was found that when a liquid crystal display including crystalline silicon TFTs having a top-gate structure is used in an HMD, as described in detail below, occurrence of a leak current through the channel light-shielding film is concerned.

The present disclosure has been made in view of the above problems, and the object thereof is to provide a liquid crystal display including crystalline silicon TFTs having a top-gate structure and being suitably used for a purpose requiring high definition.

The present disclosure discloses liquid crystal displays described in the following items.

[Item 1]

A liquid crystal display comprising:

an active matrix substrate;

an opposite substrate facing the active matrix substrate; and a liquid crystal layer provided between the active matrix substrate and the opposite substrate, the liquid crystal display including:

a plurality of pixels arranged in a matrix with a plurality of rows and a plurality of columns, wherein the active matrix substrate includes:

a first substrate;

a base coat layer provided on the first substrate;

a plurality of TFTs provided on the base coat layer and each disposed in each of the plurality of pixels;

a plurality of scanning wirings extending in the row direction; and a plurality of signal wirings extending in the column direction, the opposite substrate includes:

a second substrate; and a plurality of first light-shielding layers provided on the second substrate and each extending in the column direction, the plurality of first light-shielding layers each overlap with any of the plurality of signal wirings when viewed from a direction of a normal line of the display surface, the plurality of TFTs each includes:

a crystalline silicon semiconductor layer including a channel region;

a gate insulating layer covering the crystalline silicon semiconductor layer;

a gate electrode provided on the gate insulating layer;

a source electrode including a first connection portion being in contact with the crystalline silicon semiconductor layer; and a drain electrode including a second connection portion being in contact with the crystalline silicon semiconductor layer, the active matrix substrate further includes a plurality of second light-shielding layers provided between the first substrate and the base coat layer, the plurality of second light-shielding layers are each integrally formed so as to overlap with the channel region, at least a part of the first connection portion, and the second connection portion of at least one of the plurality of TFTs when viewed from a direction of a normal line of the display surface, and the base coat layer includes a silicon nitride layer.

[Item 2]

The liquid crystal display according to Item 1, wherein the base coat layer further includes a silicon oxide layer provided on the silicon nitride layer.

[Item 3]

The liquid crystal display according to Item 2, wherein the active matrix substrate further includes an interlayer insulating layer covering the gate insulating layer and the gate electrode; and the interlayer insulating layer has a thickness t1, the gate insulating layer has a thickness t2, and the silicon oxide layer has a thickness t3, where a relationship represented by $t3 > (t1+t2) \times 0.3$ is satisfied.

[Item 4]

The liquid crystal display according to Item 2, wherein
the active matrix substrate further includes an interlayer insulating layer covering the gate insulating layer and the gate electrode; and
the interlayer insulating layer has a thickness t1, the gate insulating layer has a thickness t2, and the silicon oxide layer has a thickness t3, where a relationship represented by t3>(t1+t2)×0.5 is satisfied.

[Item 5]

The liquid crystal display according to any one of Items 2 to 4, wherein
the silicon nitride layer has a thickness t4 of larger than 30 nm.

[Item 6]

The liquid crystal display according to any one of Items 2 to 4, wherein
the silicon nitride layer has a thickness t4 of larger than 50 nm.

[Item 7]

The liquid crystal display according to any one of Items 2 to 6, wherein
the first connection portion of the source electrode and the second connection portion of the drain electrode pass through the crystalline silicon semiconductor layer and the silicon oxide layer and are in contact with the silicon nitride layer.

[Item 8]

The liquid crystal display according to Item 1, wherein the base coat layer substantially includes only the silicon nitride layer.

[Item 9]

The liquid crystal display according to Item 8, wherein the interlayer insulating layer has a thickness t1, the gate insulating layer has a thickness t2, and the silicon nitride layer has a thickness t4a in a region overlapping with the channel region, where a relationship represented by t4a>(t1+t2)×0.3 is satisfied.

[Item 10]

The liquid crystal display according to Item 8, wherein the interlayer insulating layer has a thickness t1, the gate insulating layer has a thickness t2, and the silicon nitride layer has a thickness t4a in a region overlapping with the channel region, where a relationship represented by t4a>(t1+t2)×0.5 is satisfied.

[Item 11]

The liquid crystal display according to any one of Items 8 to 10, wherein
the silicon nitride layer has a thickness t4b of larger than 30 nm in a region overlapping with the first connection portion or the second connection portion.

[Item 12]

The liquid crystal display according to any one of Items 8 to 10, wherein
the silicon nitride layer has a thickness t4b of larger than 50 nm in a region overlapping with the first connection portion or the second connection portion.

[Item 13]

The liquid crystal display according to any one of Items 1 to 12, wherein
the crystalline silicon semiconductor layer is a polycrystalline silicon semiconductor layer.

[Item 14]

The liquid crystal display according to any one of Items 1 to 13, wherein the plurality of second light-shielding layers are each integrally formed so as to overlap with the channel region, at least a part of the first connection portion, and at least a part of the second connection portion of two or more of the plurality of TFTs when viewed from a direction of a normal line of the display surface.

According to embodiments of the present invention, it is possible to provide liquid crystal displays including crystalline silicon TFTs having a top-gate structure and being suitably used for a purpose requiring high definition.

BRIEF DESCRIPTION OF THE DRAWINGS

FIG. 4A is a plan view illustrating a liquid crystal display 900 of Comparative Example 2.

DETAILED DESCRIPTION OF THE INVENTION

Embodiments of the present invention will now be described with reference to the drawings. Incidentally, the present invention is not limited to the following embodiments.

Embodiment 1

Figure 1:
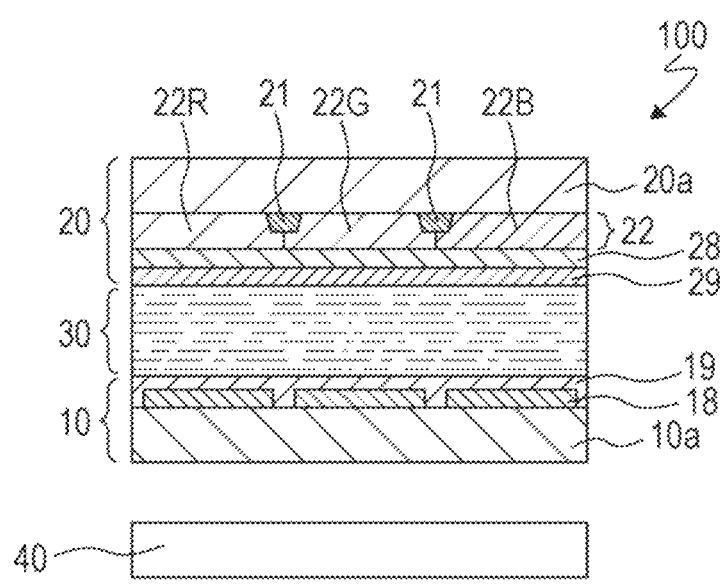
FIG. 1 is a cross-sectional view schematically illustrating a liquid crystal display 100 according to an embodiment of the present invention.

A liquid crystal display 100 in the present embodiment will be described with reference to FIG. 1. FIG. 1 is a cross-sectional view schematically illustrating the liquid crystal display 100.

As shown in FIG. 1, the liquid crystal display 100 includes an active matrix substrate (hereinafter referred to as "TFT substrate") 10, an opposite substrate (may also be referred to as "color filter substrate") 20 facing the TFT substrate 10, and a liquid crystal layer 30 provided between the TFT substrate 10 and the opposite substrate 20. The TFT substrate 10 is disposed on the back-face side of the liquid crystal layer 30, and the opposite substrate 20 is disposed on the front-face side (observer side) of the liquid crystal layer 30.

The liquid crystal display 100 further includes a backlight (lighting system) 40 disposed on the back-face side of the TFT substrate 10. The backlight 40 may be an edge-light type or may be a direct type.

In addition, the liquid crystal display 100 includes a plurality of pixels. The plurality of pixels are arranged in a matrix with a plurality of rows and a plurality of columns.

The TFT substrate 10 includes a first substrate 10a, a pixel electrode 18 provided for each pixel, and an oriented film 19 provided so as to be in contact with the liquid crystal layer 30. The opposite substrate 20 includes a second substrate 20a, a plurality of first light-shielding layers 21 and a color filter layer 22 provided on the second substrate 20a, an opposite electrode (common electrode) 28 provided so as to face the pixel electrode 18, and an oriented film 29 provided so as to be in contact with the liquid crystal layer 30. The color filter layer 22 typically includes a red color filter 22R, a green color filter 22G, and a blue color filter 22B, as shown in the drawing.

Figure 2A:
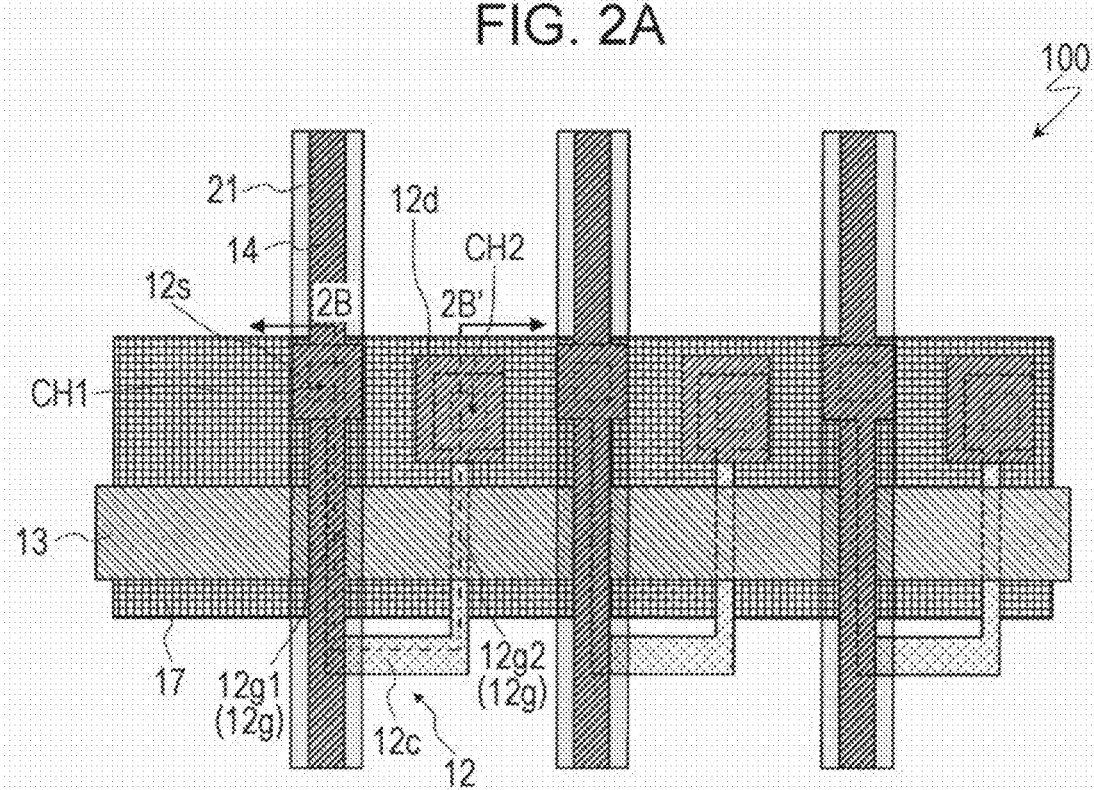
FIG. 2A is a plan view illustrating a part (vicinity of three TFTs 12) of the liquid crystal display 100.
Figure 2B:
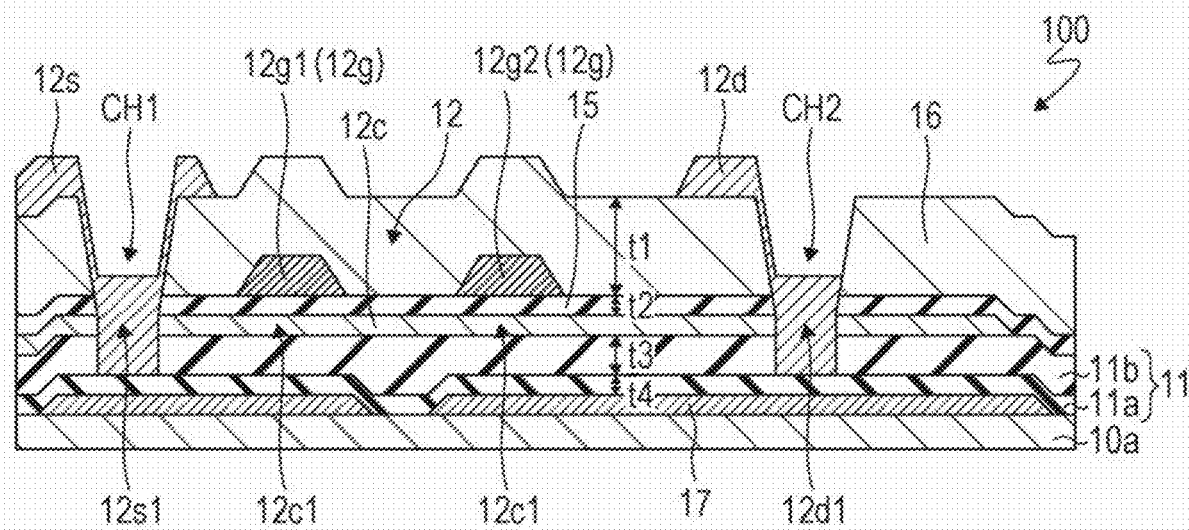
FIG. 2B is a cross-sectional view along the line 2B-2B' in FIG. 2A.

The configuration of the liquid crystal display 100 will be described in more detail with reference to FIGS. 2A and 2B. FIG. 2A is a plan view illustrating a part (vicinity of three TFTs 12) of the liquid crystal display 100, and FIG. 2B is a cross-sectional view along the line 2B-2B' in FIG. 2A. Incidentally, in FIG. 2B, a part of the components (such as the pixel electrode 18 and the oriented film 19) of the TFT substrate 10, the opposite substrate 20, and the liquid crystal layer 30 are not shown.

As shown in FIGS. 2A and 2B, the TFT substrate 10 includes a base coat layer 11 provided on a first substrate 10a, a plurality of TFTs 12 provided on the base coat layer 11 and each disposed in each pixel, a plurality of scanning wirings 13 (in FIG. 2A, only one is shown) extending in the row direction, and a plurality of signal wirings 14 extending in the column direction.

The plurality of first light-shielding layers 21 included in the opposite substrate 20 each extend in the column direction as shown in FIG. 2A. Each of the first light-shielding layers 21 overlap with any of the plurality of signal wirings 14 when viewed from a direction of a normal line of the display surface. Thus, the opposite substrate 20 does not include a light-shielding layer extending in the row direction.

The plurality of TFTs 12 each include a crystalline silicon semiconductor layer (hereinafter simply referred to as "semiconductor layer") 12c, a gate insulating layer 15 covering the semiconductor layer 12c, a gate electrode 12g (12g1, 12g2) provided on the gate insulating layer 15, and a source electrode 12s and a drain electrode 12d electrically connected to the semiconductor layer 12c. Each of the TFTs 12 has a top-gate structure.

The semiconductor layer 12c includes a channel region 12c1. The channel region 12c1 is a region facing the gate electrode 12g via the gate insulating layer 15 and is, for example, an LTPS (low-temperature polysilicon) semiconductor layer.

The gate electrode 12g is electrically connected to the scanning wiring 13 and receives a scanning signal from the scanning wiring 13. In the example shown by the drawing, a portion of the scanning wiring 13 overlapping with the semiconductor layer 12c functions as the gate electrode 12g. In addition, in the example shown by the drawing, since the semiconductor layer 12c overlaps with the scanning wiring 13 at two positions, each of the TFTs 12 includes two gate electrodes 12g1 and 12g2, and the semiconductor layer 12c includes two channel regions 12c1. That is, each of the TFTs 12 has a so-called double-gate structure.

An interlayer insulating layer 16 is provided so as to cover the gate electrodes 12g1 and 12g2 and the gate insulating layer 15. The source electrode 12s and the drain electrode 12d are provided on the interlayer insulating layer 16.

The source electrode 12s includes a portion (hereinafter referred to as "first connection portion") 12s1 being in contact with the semiconductor layer 12c. The first connection portion 12s1 of the source electrode 12s is connected to the semiconductor layer 12c in a source contact hole CH1 formed in at least the interlayer insulating layer 16 and the gate insulating layer 15. Here, a part (widened portion) of the signal wiring 14 functions as the source electrode 12s.

The drain electrode 12d includes a portion (hereinafter referred to as "second connection portion") 12d1 being in contact with the semiconductor layer 12c. The second connection portion 12d1 of the drain electrode 12d is connected to the semiconductor layer 12c in a drain contact hole CH2 formed in at least the interlayer insulating layer 16 and the gate insulating layer 15.

The TFT substrate 10 further includes a plurality of second light-shielding layers (channel light-shielding films) 17 provided between the first substrate 10a and the base coat layer 11. FIGS. 2A and 2B each show one of the plurality of second light-shielding layers 17.

Each of the second light-shielding layers 17 is integrally formed so as to overlap with the channel region 12c1, at least a part of the first connection portion 12s1, and the second connection portion 12d1 of at least one of the plurality of TFTs 12 when viewed from a direction of a normal line of the display surface. In the example shown by the drawing, the second light-shielding layer 17 overlaps with the channel region 12c1, the first connection portion 12s1, and the second connection portion 12d1 of three or more TFTs 12.

The base coat layer 11 includes a silicon nitride (SiNx) layer 11a and a silicon oxide ($SiO_2$) layer 11b provided on the silicon nitride layer 11a. That is, the base coat layer 11 has a layered structure including the silicon nitride layer 11a. In the example shown by the drawing, the first connection portion 12s1 of the source electrode 12s and the second connection portion 12d1 of the drain electrode 12d pass through the semiconductor layer 12c and the silicon oxide layer 11b of the base coat layer 11 and are in contact with the silicon nitride layer 11a.

The liquid crystal display 100 in the present embodiment has the above-described configuration and thereby can suppress the occurrence of a leak current through the second light-shielding layer 17 as the channel light-shielding film. This point will now be described with reference to the liquid crystal display 800 of Comparative Example 1 shown in FIG. 3 and also the liquid crystal display 900 of Comparative Example 2 shown in FIGS. 4A and 4B.

Figure 3:
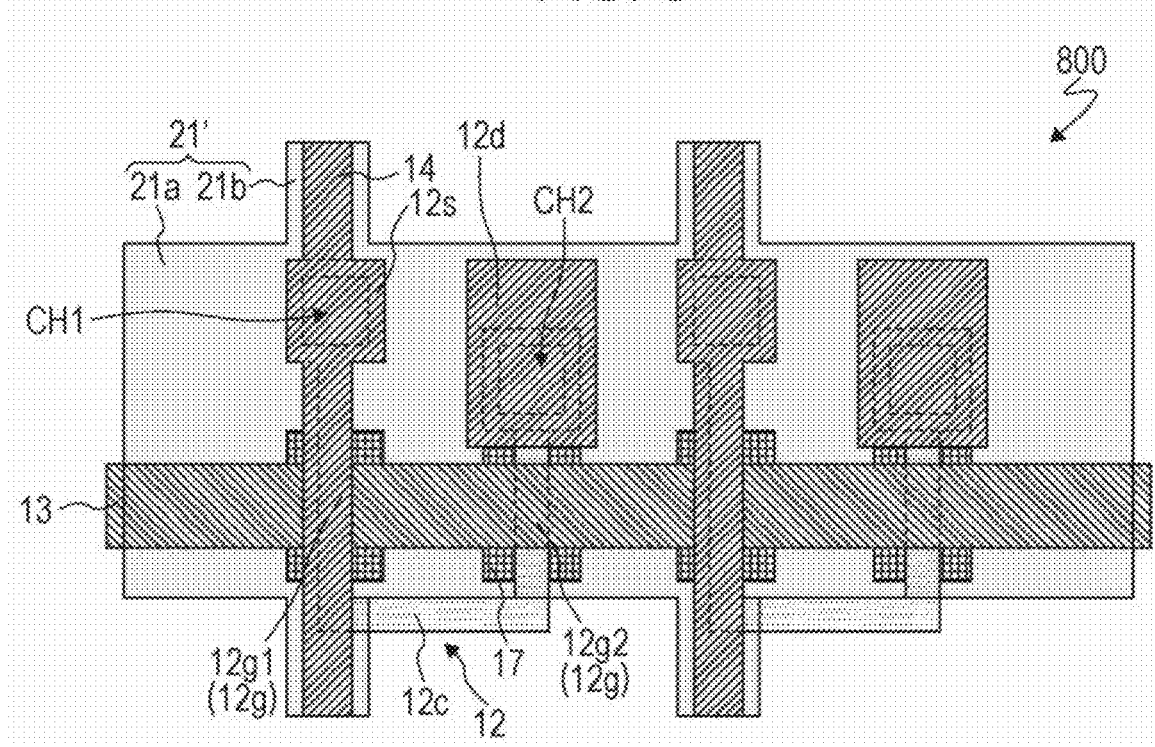
FIG. 3 is a plan view illustrating a liquid crystal display 800 of Comparative Example 1.

The liquid crystal display 800 of Comparative Example 1 has a layout estimating a smart phone with a screen size of 4 to 6 inches with a resolution of FHD to WQHD. In this case, the pixel pitch is about 15 to 30 µm. The liquid crystal display 800 includes a first light-shielding layer (black matrix) 21' provided on the opposite substrate side as shown in FIG. 3. The black matrix 21' includes a plurality of portions 21a extending in the row direction and a plurality of portions 21b extending in the column direction and has a lattice shape. The portion 21a extending in the row direction overlaps with the scanning wiring 13, the source contact hole CH1, and the drain contact hole CH2. The portion 21b extending in the column direction overlaps with the signal wiring 14. In addition, the liquid crystal display 800 includes a plurality of second light-shielding layers (channel light-shielding films) 17' provided on the TFT substrate side. The plurality of second light-shielding layers 17' are individually formed for each of the channel regions (such that one second light-shielding layer 17' overlaps with one channel region). Each of the second light-shielding layers 17' overlaps with the channel region (i.e., with the gate electrode 12g) but does not overlap with the source contact hole CH1 and the drain contact hole CH2.

The liquid crystal display 900 of Comparative Example 2 has a layout that has been examined for an HMD by the present inventor. It is estimated to have a screen size of 3 inches and a pixel pitch of less than 10 µm.

The liquid crystal display 900 includes a plurality of first light-shielding layers 21 provided on the opposite substrate side and extending in the column direction as shown in FIG. 4A. Each of the plurality of first light-shielding layers 21 overlaps with each of a plurality of signal wirings 14. Thus, no light-shielding layer extending in the row direction is provided on the opposite substrate side. This is because that when the pixel pitch is less than 10 µm, it is difficult to form a lattice black matrix due to restriction of micromachining.

Figure 4B:
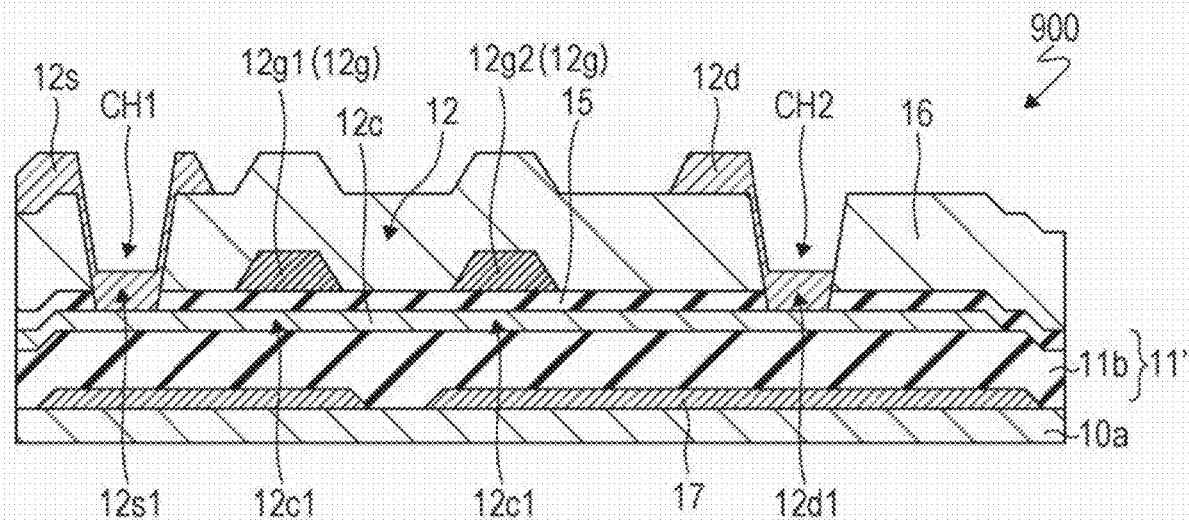
FIG. 4B is a cross-sectional view along the line 4B-4B' in FIG. 4A.

In addition, the liquid crystal display 900 includes a plurality of second light-shielding layers (channel light-shielding films) 17 provided on the TFT substrate side as shown in FIGS. 4A and 4B. Each of the plurality of second light-shielding layers 17 is integrally formed for a single pixel or for a plurality of pixels so as to shield the channel region 12c1, the source contact hole CH1, and the drain contact hole CH2 of the TFT 12 from light. In the example shown by the drawing, the second light-shielding layer 17 is integrally formed for three or more pixels. When the pixel pitch is less than 10 µm, it is difficult from the viewpoint of machining accuracy to divide and form the second light-shielding layers 17 in a pixel. The base coat layer 11' of the liquid crystal display 900 has a single-layer structure including only a silicon oxide layer 11b. That is, the base coat layer 11' does not include a silicon nitride layer.

Figure 4C:
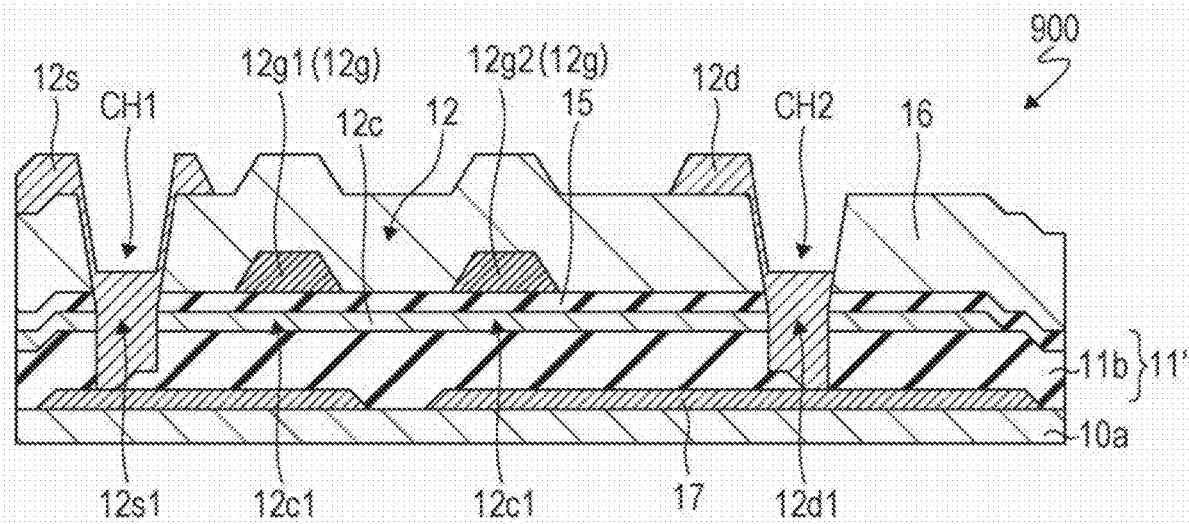
FIG. 4C is a diagram illustrating a state in which a leak through a channel light-shielding film 17 occurs in the liquid crystal display 900 of Comparative Example 2.

In the liquid crystal display 900 of Comparative Example 2, occurrence of a leak current through the second light-shielding layer 17 as the channel light-shielding film is concerned. Since the source contact hole CH1 and the drain contact hole CH2 are minute, they are generally formed by dry etching. In the dry etching, the base coat layer 11 (silicon oxide layer 11b) may be etched over the semiconductor layer 12c in a part of the substrate under the influence of the distribution within the plane of the substrate of the film formation and etching equipment. After dry etching, HF (hydrofluoric acid) washing treatment is generally performed for removing a natural oxide film on the surface of the semiconductor layer 12c to secure the ohmic characteristics of the semiconductor layer 12c with the source electrode 12s and the drain electrode 12d. On this occasion, if the base coat layer 11 is further etched until the opening portion reaches the second light-shielding layer (second light-shielding layer) 17, as shown in FIG. 4C, the first connection portion 12s1 of the source electrode 12s and the second connection portion 12d1 of the drain electrode 12d are conducted through the second light-shielding layer 17 to cause a leak. Incidentally, although an example of a leak between the source and the drain in a single pixel has been described here, when a second light-shielding layer 17 is integrally formed for a plurality of pixels, a leak may also occur between pixels.

In contrast, in the liquid crystal display 100 of the present embodiment, the base coat layer 11 includes a silicon nitride layer 11a. Since the silicon nitride layer 11a has a very low etching rate against HF-based chemical solutions and functions as an etching stopper in the HF washing treatment, it is possible to prevent the source contact hole CH1 and the drain contact hole CH2 from reaching the second light-shielding layer 17. Accordingly, it is possible to prevent the conduction between the source electrode 12s and the drain electrode 12d of the TFT 12 of any pixel through the second light-shielding layer 17 and the conduction between the source electrode 12s and/or the drain electrode 12d of the TFT 12 of any pixel and the source electrode 12s and/or the drain electrode 12d of the TFT 12 of another pixel through the second light-shielding layer 17. Accordingly, it is possible to suppress the occurrence of a leak current through the second light-shielding layer 17 as the channel light-shielding film.

Figure 5:
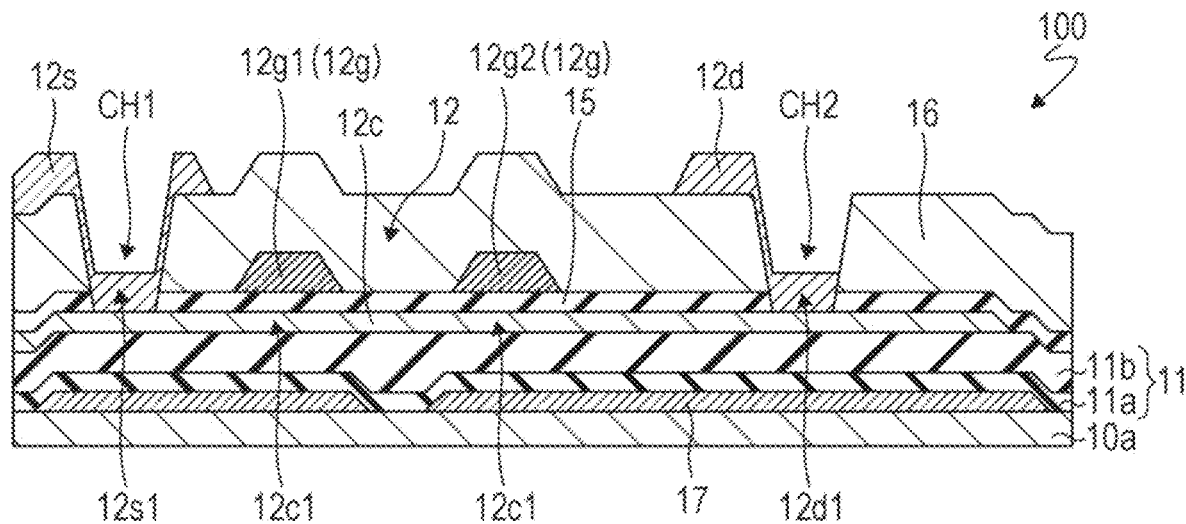
FIG. 5 is a cross-sectional view illustrating another example of the configuration of the liquid crystal display 100.

Incidentally, although FIG. 2B shows an example in which the first connection portion 12s1 of the source electrode 12s and the second connection portion 12d1 of the drain electrode 12d pass through the semiconductor layer 12c and the silicon oxide layer 11b and are in contact with the silicon nitride layer 11a, the embodiment of the present invention is not limited to this example. As shown in FIG. 5, the first connection portion 12s1 of the source electrode 12s and the second connection portion 12d1 of the drain electrode 12d need not pass through the semiconductor layer 12c and the silicon oxide layer 11b and may be in contact with the upper surface of the semiconductor layer 12c.

As the example shown in FIG. 2B, a configuration in which the first connection portion 12s1 of the source electrode 12s and the second connection portion 12d1 of the drain electrode 12d pass through the semiconductor layer 12c and the silicon oxide layer 11b and are in contact with the silicon nitride layer 11a can be obtained by, as described later, stopping dry etching for forming the source contact hole CH1 and the drain contact hole CH2 in halfway through the silicon oxide layer 11b of the base coat layer 11 and removing the remaining silicon oxide layer 11b by wet etching to cause etch stop on the silicon nitride layer 11a (the etching rate of the silicon nitride layer 11a is highly reduced by etching with an HF-based chemical solution). By employing the configuration shown in FIG. 2B, the thickness of the base coat layer 11 after etching for forming the source contact hole CH1 and the drain contact hole CH2 can be easily adjusted within a certain range under the first connection portion 12s1 of the source electrode 12s and under the second connection portion 12d1 of the drain electrode 12d. Accordingly, the electric field strength applied to the base coat layer 11 by the video voltage between source and drain can be easily maintained within a certain range, the potential fluctuation of the second light-shielding layer 17 in a floating state by the video voltage can be controlled within a certain range, and the display quality can be improved.

When the configuration shown in FIG. 2B is employed (i.e., in a case in which the silicon oxide layer 11b is left during the dry etching for forming the source contact hole CH1 and the drain contact hole CH2 and is then removed by wet etching), the thickness t3 of the silicon oxide layer 11b (see FIG. 2B) is preferably set such that the silicon nitride layer 11a is not dry-etched. Specifically, the thickness t1 of the interlayer insulating layer 16, the thickness t2 of the gate insulating layer 15, and the thickness t3 of the silicon oxide layer 11b preferably satisfy a relationship represented by $t3>(t1+t2)\times 0.3$, more preferably a relationship represented by $t3>(t1+t2)\times 0.5$.

In addition, the thickness t4 of the silicon nitride layer 11a is preferably set such that a breakdown voltage can be secured even if a video voltage is applied between source and drain. Specifically, the thickness t4 of the silicon nitride layer 11a is preferably greater than 30 nm and more preferably greater than 50 nm.

Figure 6:
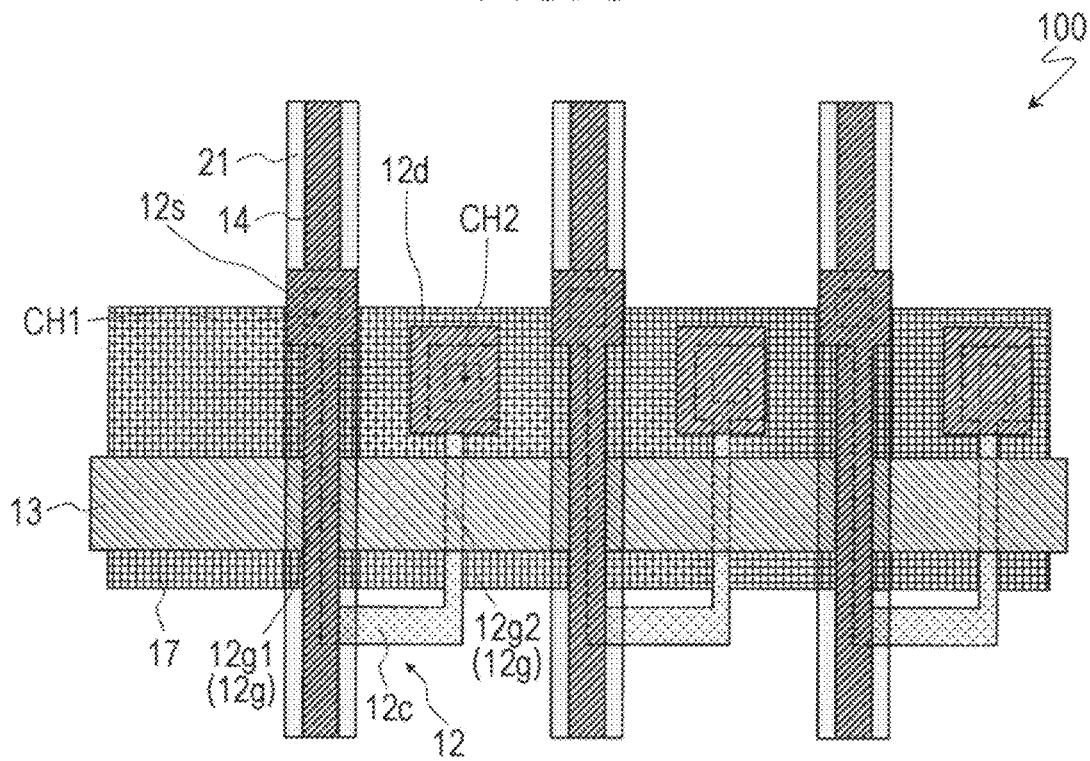
FIG. 6 is a plan view illustrating another example of the configuration of the liquid crystal display 100.

Incidentally, although FIG. 2A, etc. show a configuration in which the entire first connection portion 12s1 of the source electrode 12s (the entire source contact hole CH1) overlaps with the second light-shielding layers 17, a part of the first connection portion 12s1 of the source electrode 12, i.e., a part of the source contact hole CH1, need not overlap with the second light-shielding layer 17 as shown in FIG. 6.

In addition, although the description above does not refer to the display mode of the liquid crystal display 100, a variety of known modes can be used as the display mode. FIG. 1 shows an example of a display mode configuration using a vertical electric field (an example in which the common electrode 21 is provided on the opposite substrate 20 side), but the display mode may be a type using a horizontal electric field. In such a case, the common electrode is provided on the TFT substrate 10 side. In addition, the display mode may be a type using both a vertical electric field and a horizontal electric field.

A method for manufacturing the liquid crystal display 100 will be described with reference to FIGS. 7A to 7I. FIGS. 7A to 7I are process cross-sectional views for explaining an example of the method for manufacturing the liquid crystal display 100 and show a cross section corresponding to that shown in FIG. 2B.

Figure 7A:
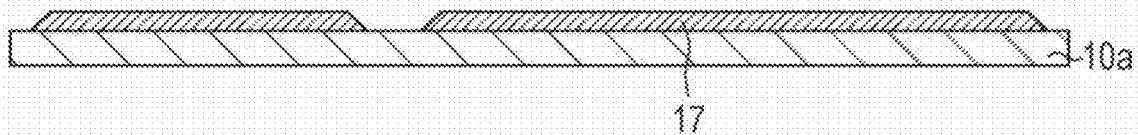
FIG. 7A is a process cross-sectional view for explaining an example of a method for manufacturing the liquid crystal display 100.

First, as shown in FIG. 7A, a plurality of second light-shielding layers 17 are formed as channel light-shielding films on a substrate 10a. Specifically, a light-shielding film consisting of an electrically conductive material having a light-shielding property is deposited on the substrate 10a, and the light-shielding film is then patterned to form second light-shielding layers 17. The substrate 10a is, for example, a glass substrate. As the material for the second light-shielding layers 17, for example, a metal material, such as molybdenum (Mo) or a molybdenum tungsten alloy (MoW), can be suitably used. The thickness of the second light-shielding layers 17 is, for example, 30 nm or more and 100 nm or less.

Figure 7B:
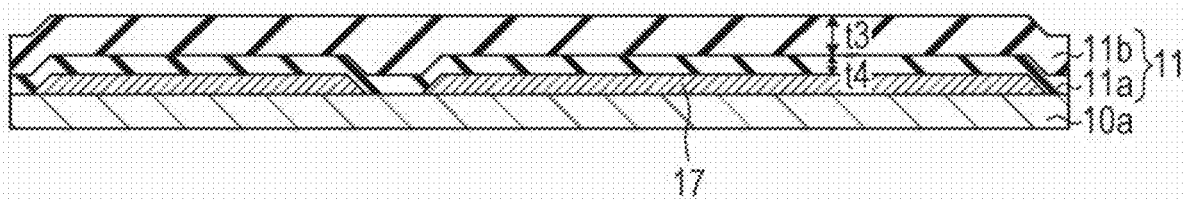
FIG. 7B is a process cross-sectional view for explaining an example of the method for manufacturing the liquid crystal display 100.

Subsequently, as shown in FIG. 7B, a base coat layer 11 is formed by stacking a silicon nitride layer 11a and a silicon oxide layer 11b in this order so as to cover the plurality of second light-shielding layers 17. As already described, the thickness t4 of the silicon nitride layer 11a is preferably greater than 30 nm and more preferably greater than 50 nm. In addition, the thickness t3 of the silicon oxide layer 11b preferably satisfies, together with the thicknesses t1 and t2 of the interlayer insulating layer 16 and the gate insulating layer 15, respectively, to be formed later, a relationship represented by $t3>(t1+t2)\times 0.3$ and more preferably a relationship represented by $t3>(t1+t2)\times 0.5$.

Figure 7C:
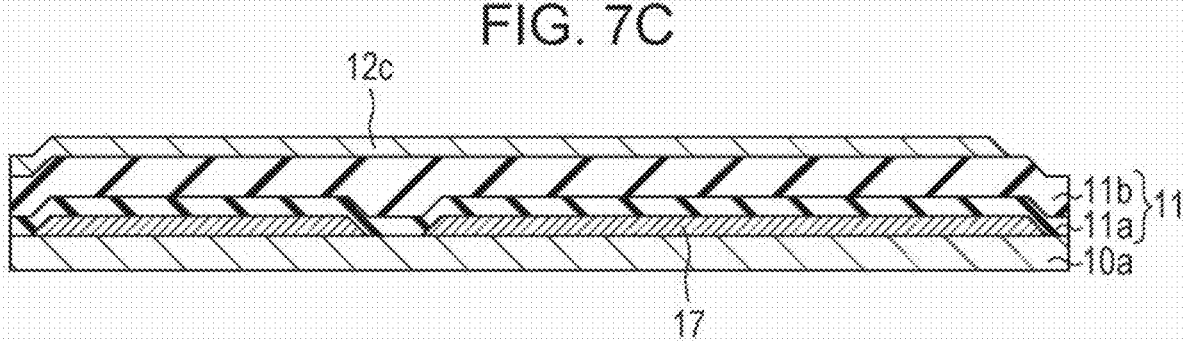
FIG. 7C is a process cross-sectional view for explaining an example of the method for manufacturing the liquid crystal display 100.

Subsequently, as shown in FIG. 7C, a crystalline silicon semiconductor layer (here polycrystalline silicon semiconductor layer) 12c is formed on the base coat layer 11. The crystalline silicon semiconductor layer 12c can be formed by, for example, first forming an amorphous silicon (a-Si) film, then crystallizing the a-Si film to form a polycrystalline silicon (p-Si) film, and then patterning the p-Si film. The a-Si film can be formed by a known method, such as a plasma CVD method or a sputtering method. The a-Si film can be crystallized by, for example, irradiating the a-Si film with excimer laser light. The thickness of the semiconductor layer 12c is, for example, 30 nm or more and 60 nm less.

Figure 7D:
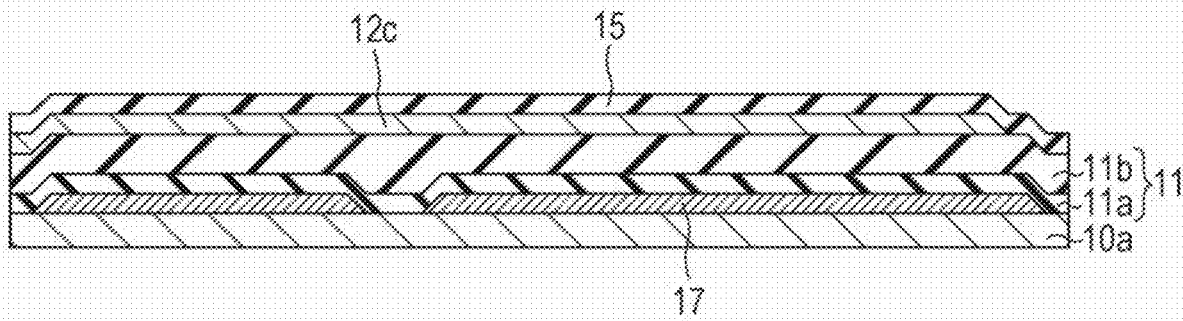
FIG. 7D is a process cross-sectional view for explaining an example of the method for manufacturing the liquid crystal display 100.

Then, as shown in FIG. 7D, a gate insulating layer 15 covering the semiconductor layer 12c is formed. The gate insulating layer 15 is, for example, a silicon oxide layer having a thickness of 60 nm or more and 120 nm or less. The gate insulating layer 15 is formed by, for example, a CVD method.

Figure 7E:
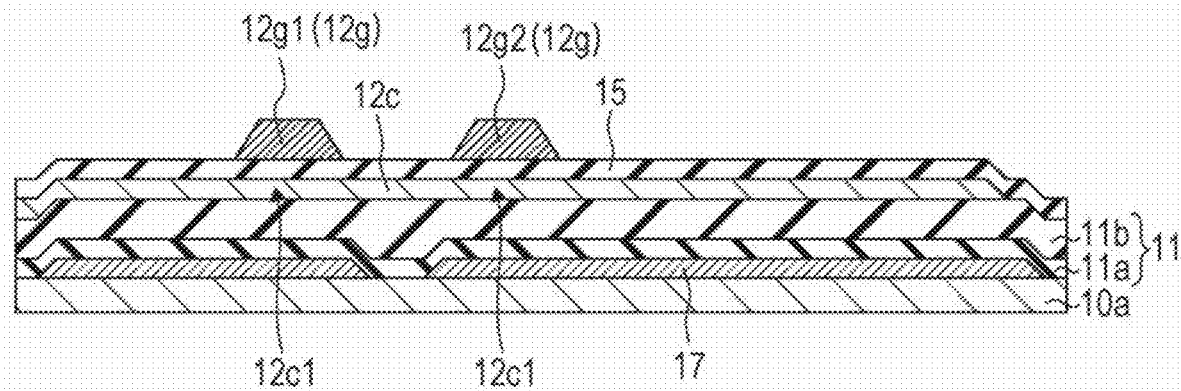
FIG. 7E is a process cross-sectional view for explaining an example of the method for manufacturing the liquid crystal display 100.

Next, as shown in FIG. 7E, a gate electrodes 12g and scanning wirings 13 (not shown in FIG. 7E) are formed by depositing an electrically conductive film (gate metal film) on the gate insulating layer 15 and then patterning the film. The material for the gate metal film is not particularly limited, and a metal, such as aluminum (Al), tungsten (W), molybdenum (Mo), tantalum (Ta), chromium (Cr), titanium (Ti), or copper (Cu), or an alloy thereof can be appropriately used. In addition, the gate metal film may be a layered film formed by stacking of a plurality of films made of these materials. The patterning method is not particularly limited, and known photolithography and dry etching can be used. The thicknesses of the gate electrode 12g and the scanning wiring 13 are, for example, 200 nm or more and 500 nm or less.

Then, an impurity is injected into the semiconductor layer 12c using the gate electrode 12g as a mask. The region where the impurity is not injected in the semiconductor layer 12c becomes an active region (channel region) 12c1.

Figure 7F:
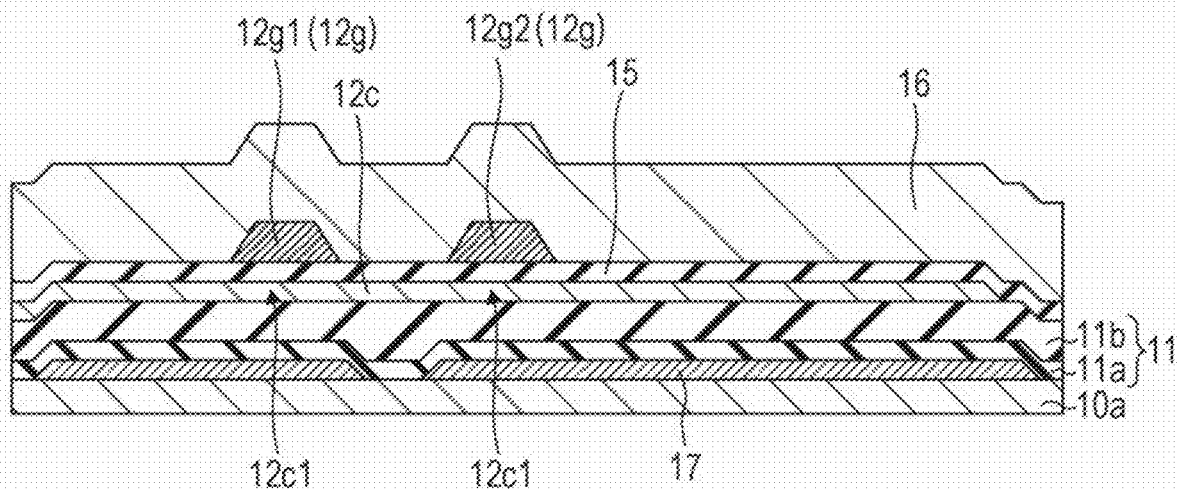
FIG. 7F is a process cross-sectional view for explaining an example of the method for manufacturing the liquid crystal display 100.

Next, as shown in FIG. 7F, an interlayer insulating layer 16 covering the gate insulating layer 15, the gate electrodes 12g, and the scanning wirings 13 are formed. The interlayer insulating layer 16 has a layered structure including, for example, a silicon oxide layer as an upper layer and a silicon nitride layer as a lower layer. The thickness of the silicon oxide layer (upper layer) is, for example, 400 nm or more and 700 nm or less, and the thickness of the silicon nitride layer (lower layer) is, for example, 100 nm or more and 400 nm or less. Incidentally, the interlayer insulating layer 16 need not necessarily have a layered structure and may be, for example, a monolayer of a silicon nitride layer. The interlayer insulating layer 16 is formed by, for example, a CVD method.

Figure 7G:
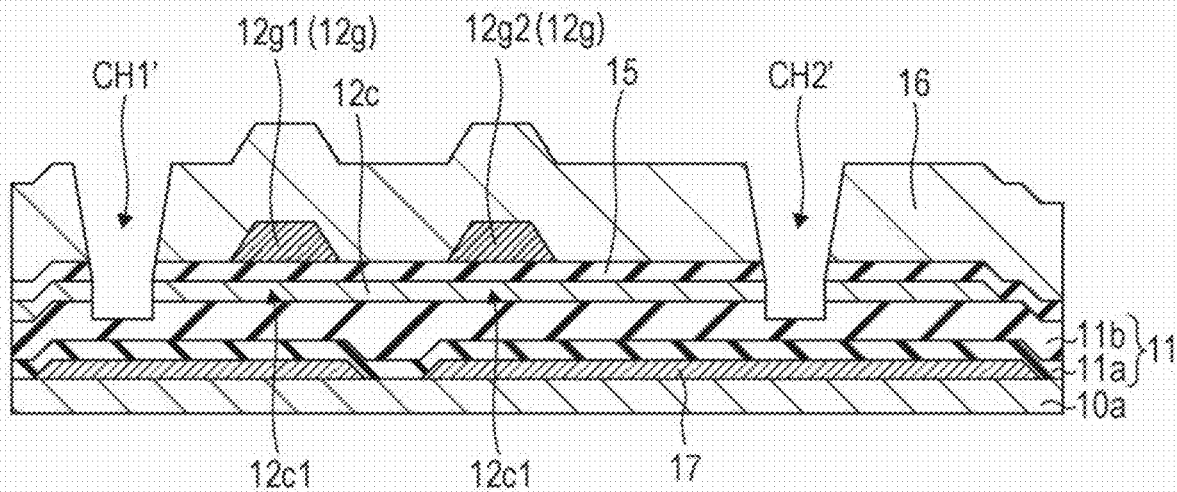
FIG. 7G is a process cross-sectional view for explaining an example of the method for manufacturing the liquid crystal display 100.
Figure 7H:
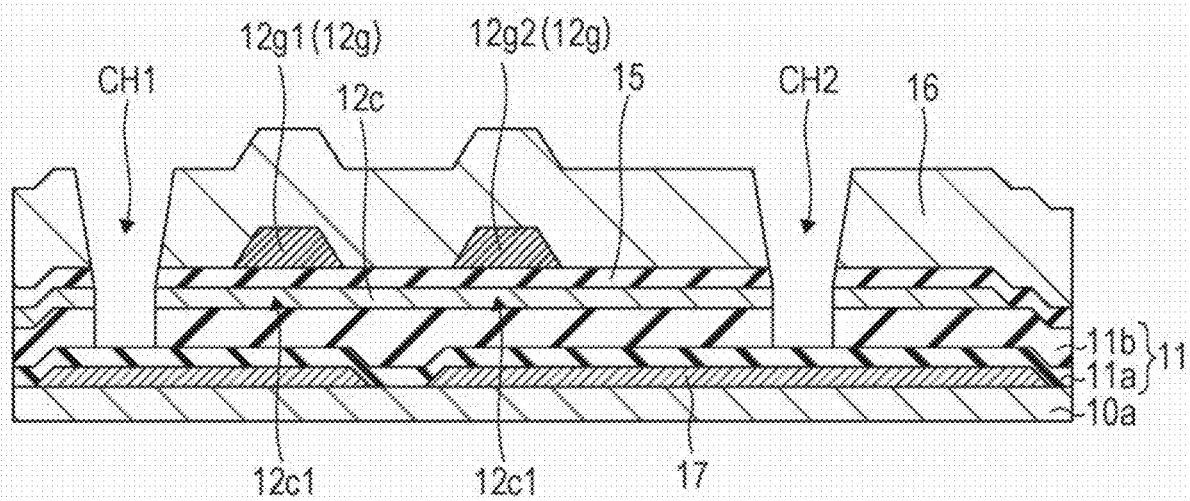
FIG. 7H is a process cross-sectional view for explaining an example of the method for manufacturing the liquid crystal display 100.

Subsequently, a source contact hole CH1 and a drain contact hole CH2 are formed at least in the interlayer insulating layer 16 and the gate insulating layer 15. Here, the source contact hole CH1 and the drain contact hole CH2 are formed so as to pass through not only the interlayer insulating layer 16 and the gate insulating layer 15 but also the semiconductor layer 12c and the silicon oxide layer 11b of the base coat layer 11 and to reach the upper surface of the silicon nitride layer 11a. Specifically, first, as shown in FIG. 7G, opening portions CH1' and CH2' reaching halfway through the silicon oxide layer 11b of the base coat layer 11 by dry etching. Subsequently, as shown in FIG. 7H, the silicon oxide layer lib remaining under the opening portions CH1' and CH2' is removed by wet etching using an HF-based chemical solution to form a source contact hole CH1 and a drain contact hole CH2 exposing the silicon nitride layer 11a.

Figure 7I:
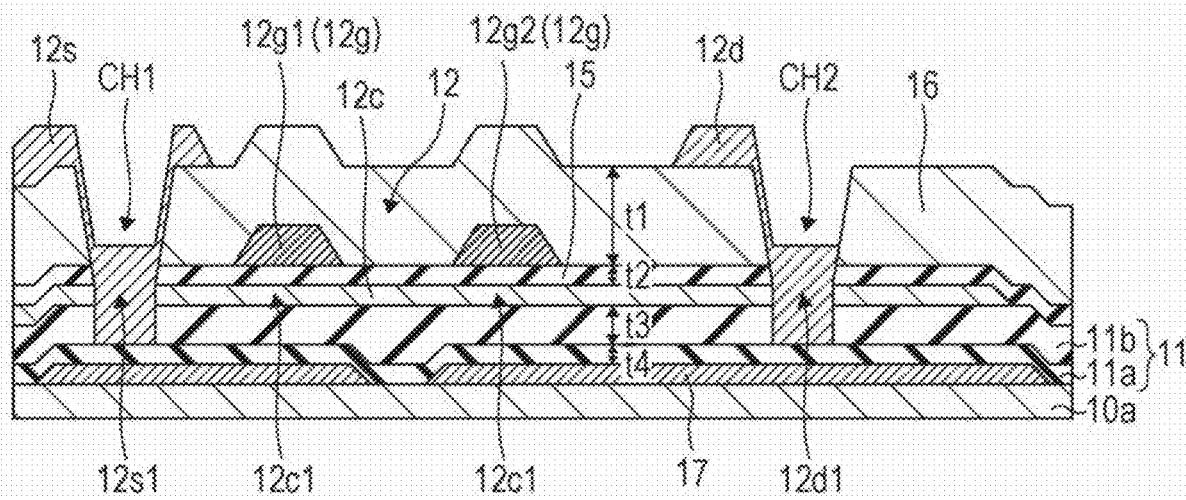
FIG. 7I is a process cross-sectional view for explaining an example of the method for manufacturing the liquid crystal display 100.

Then, as shown in FIG. 7I, a source electrode 12s, a drain electrode 12d, and signal wirings 14 (here not shown) are formed by depositing an electrically conductive film (source metal film) on the interlayer insulating layer 16 and in the source contact hole CH1 and the drain contact hole CH2 and then patterning the film. The material for the source metal film is, for example, aluminum. The source metal film may have a layered structure including an upper layer of an aluminum film and/or a barrier metal layer (e.g., a Ti film or a Mo film) in a lower layer. Incidentally, the material for the source metal film is not particularly limited. As the source metal film, a film containing a metal, such as aluminum (Al), tungsten (W), molybdenum (Mo), tantalum (Ta), copper (Cu), chromium (Cr), or titanium (Ti), or an alloy or a nitride thereof can be appropriately used. In addition, a layered film in which a plurality of such films are stacked may be used. For example, a layered film (Ti/Al/Ti) in which a Ti film, an Al film, and a Ti film are stacked in this order may be used. The thicknesses of the source electrode 12s and other films are, for example, 200 nm or more and 600 nm or less.

Next, a passivation film and a flattening film are formed in this order so as to cover the TFT 12, and then a pixel electrode 18 and an oriented film 19 are formed in this order on the flattening film to complete a TFT substrate 10. A liquid crystal layer 30 is formed by pasting the TFT substrate 10 and an opposite substrate 20 produced separately from the TFT substrate 10 and injecting and sealing a liquid crystal material between the TFT substrate 10 and the opposite substrate 20 to obtain a liquid crystal display 100. The opposite substrate 20 can be produced by a known method. However, the first light-shielding layer 21 of the opposite substrate 20 is formed so as to extend in the column direction instead of a lattice such as a known black matrix. The liquid crystal layer 30 may be formed by a falling drop method.

Embodiment 2

Figure 8:
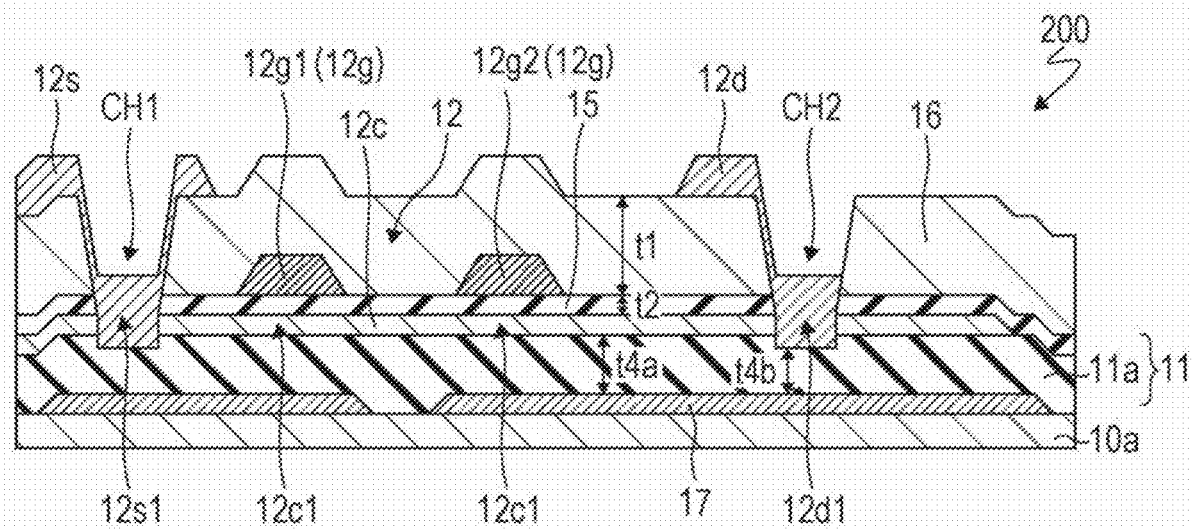
FIG. 8 is a cross-sectional view schematically illustrating another liquid crystal display 200 according to an embodiment of the present invention.

A liquid crystal display 200 in the present embodiment will be described with reference to FIG. 8. FIG. 8 is a cross-sectional view schematically illustrating the liquid crystal display 200. In the following, description will be made focusing on differences of the liquid crystal display 200 in the present embodiment from the liquid crystal display 100 in Embodiment 1.

The liquid crystal display 200 differs from the liquid crystal display 100 of Embodiment 1 in that the base coat layer 11 has a single-layer structure including substantially only a silicon nitride layer 11a, that is, the base coat layer 11 does not include a silicon oxide layer.

Also in the liquid crystal display 200 of the present embodiment, the base coat layer 11 includes a silicon nitride layer 11a, and the silicon nitride layer 11a functions as an etching stopper in HF washing treatment. Accordingly, it is possible to prevent the source contact hole CH1 and the drain contact hole CH2 from reaching the second light-shielding layer 17 and to suppress the occurrence of a leak current through the second light-shielding layer 17 as the channel light-shielding film.

Incidentally, in the liquid crystal display 200, the thickness $t4b$ of the silicon nitride layer 11a in a region overlapping with the first connection portion 12s1 of the source electrode 12s or the second connection portion 12d1 of the drain electrode 12d is likely different from the thickness of another region (e.g., the thickness $t4a$ of the region overlapping with the channel region 12c1). This is because that the region of the silicon nitride layer 11a overlapping with the first connection portion 12s1 or the second connection portion 12d1 may be somewhat etched by dry etching when the source contact hole CH1 and the drain contact hole CH2 are formed.

Accordingly, the thickness of the silicon nitride layer 11a before dry etching is preferably set such that the region of the silicon nitride layer 11a overlapping with the first connection portion 12s1 or the second connection portion 12d1 sufficiently remains after dry etching. Specifically, the thickness of the silicon nitride layer 11a before dry etching is preferably greater than 30%, more preferably 50%, of the sum of the thickness t1 of the interlayer insulating layer 16 and the thickness t2 of the gate insulating layer 15. Since the thickness $t4a$ of the silicon nitride layer 11a in the region overlapping with the channel region 12c1 is almost unchanged before and after the dry etching, the thickness t1 of interlayer insulating layer 16, the thickness t2 of the gate insulating layer 15, and the thickness $t4a$ of the silicon nitride layer 11a in the region overlapping with the channel region 12c1 preferably satisfy a relationship represented by $t4a>(t1+t2)\times0.3$ and more preferably satisfy a relationship represented by $t4a>(t1+t2)\times0.5$.

In addition, the thickness $t4b$ of the silicon nitride layer 11a in the region overlapping with the first connection portion 12s1 of the source electrode 12s or the second connection portion 12d1 of the drain electrode 12d is preferably set such that a breakdown voltage can be secured even if a video voltage is applied between source and drain. Specifically, the thickness $t4b$ of the silicon nitride layer 11a in the region overlapping with the first connection portion 12s1 of the source electrode 12s or the second connection portion 12d1 of the drain electrode 12d is preferably greater than 30 nm and more preferably greater than 50 nm.

As described above, even if the base coat layer 11 is a single layer of a silicon nitride layer 11a, it is possible to suppress the occurrence of a leak current through the second light-shielding layer (channel light-shielding film) 17. When the base coat layer 11 has a layered structure including a silicon oxide layer 11b in addition to a silicon nitride layer 11a as in the liquid crystal display 100 of Embodiment 1, an advantage that the heat is hardly lost during crystallization of the a-Si film is obtained. In addition, an advantage that the adhesion between the semiconductor layer 12c and the base coat layer 11 is enhanced is also obtained.

According to embodiments of the present invention, it is possible to provide a liquid crystal display including crystalline silicon TFTs having a top-gate structure and being suitably used for a purpose (e.g., an HMD) requiring high definition. The embodiments of the present invention are suitably used in liquid crystal displays of a variety of display modes.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display comprising:
   an active matrix substrate;
   an opposite substrate facing the active matrix substrate; and
   a liquid crystal layer provided between the active matrix substrate and the opposite substrate,
   the liquid crystal display comprising:
   a plurality of pixels arranged in a matrix with a plurality of rows and a plurality of columns, wherein
   the active matrix substrate includes:
   a first substrate;
   a base coat layer provided on the first substrate;
   a plurality of TFTs provided on the base coat layer and each disposed in each of the plurality of pixels;
   a plurality of scanning wirings extending in the row direction; and
   a plurality of signal wirings extending in the column direction,
   the opposite substrate includes:
   a second substrate; and
   a plurality of first light-shielding layers provided on the second substrate and each extending in the column direction,
   the plurality of first light-shielding layers each overlap with any of the plurality of signal wirings when viewed from a direction of a normal line of a surface of the display,
   the plurality of TFTs each includes:
   a crystalline silicon semiconductor layer including a channel region;
   a gate insulating layer covering the crystalline silicon semiconductor layer;
   a gate electrode provided on the gate insulating layer;
   a source electrode including a first connection portion being in contact with the crystalline silicon semiconductor layer; and
   a drain electrode including a second connection portion being in contact with the crystalline silicon semiconductor layer,
   the active matrix substrate further includes a plurality of second light-shielding layers provided between the first substrate and the base coat layer, the plurality of second light-shielding layers are each integrally formed so as to overlap with the channel region, at least a part of the first connection portion, and the second connection portion of at least one of the plurality of TFTs when viewed from a direction of a normal line of the display surface, and
   the base coat layer includes a silicon nitride layer and a silicon oxide layer provided on the silicon nitride layer, wherein
   the first connection portion of the source electrode and the second connection portion of the drain electrode pass through the crystalline silicon semiconductor layer and the silicon oxide layer and are in contact with the silicon nitride layer.

2. The liquid crystal display according to claim 1, wherein
   the active matrix substrate further includes an interlayer insulating layer covering the gate insulating layer and the gate electrode; and
   the interlayer insulating layer has a thickness t1, the gate insulating layer has a thickness t2, and the silicon oxide layer has a thickness t3, where a relationship represented by $t3>(t1+t2)\times0.3$ is satisfied.

3. The liquid crystal display according to claim 1, wherein
   the active matrix substrate further includes an interlayer insulating layer covering the gate insulating layer and the gate electrode; and
   the interlayer insulating layer has a thickness t1, the gate insulating layer has a thickness t2, and the silicon oxide layer has a thickness t3, where a relationship represented by $t3>(t1+t2)\times0.5$ is satisfied.

4. The liquid crystal display according to claim 1, wherein the silicon nitride layer has a thickness t4 of larger than 30 nm.

5. The liquid crystal display according to claim 1, wherein the silicon nitride layer has a thickness t4 of larger than 50 nm.

6. The liquid crystal display according to claim 1, wherein the crystalline silicon semiconductor layer is a polycrystalline silicon semiconductor layer.

7. The liquid crystal display according to claim 1, wherein the plurality of second tight-shielding layers are each integrally formed so as to overlap with the channel region, at least a part of the first connection portion, and at least a part of the second connection portion of two or more of the plurality of TFTs when viewed from a direction of a normal line of the display surface.

* * * * *